United States Patent [19]
Yokota et al.

[11] Patent Number: 5,001,870
[45] Date of Patent: Mar. 26, 1991

[54] METHOD OF CUTTING AND DISASSEMBLING CYLINDRICAL STRUCTURE

[75] Inventors: Isaya Yokota, Tokyo; Kenjiro Nakamura, Chiba; Kenji Nishi, Tokyo, all of Japan

[73] Assignee: Kajima Corporation, Tokyo, Japan

[21] Appl. No.: 401,843

[22] Filed: Sep. 1, 1989

Related U.S. Application Data

[62] Division of Ser. No. 250,953, Sep. 29, 1988.

[30] Foreign Application Priority Data

| Oct. 5, 1987 | [JP] | Japan | 62-249986 |
| Oct. 5, 1987 | [JP] | Japan | 62-249987 |
| Oct. 5, 1987 | [JP] | Japan | 62-249988 |

[51] Int. Cl.$^5$ ............................................. B24C 3/06
[52] U.S. Cl. ..................................... 51/410; 51/425; 51/429; 51/241 S; 29/426.3
[58] Field of Search ............... 51/410, 424, 425, 429, 51/321, 415, 416, 411, 241 S; 125/12; 29/426.3–426.5

[56] References Cited

U.S. PATENT DOCUMENTS

| 4,297,061 | 10/1981 | Wolfe et al. ........................ 51/241 S |
| 4,677,936 | 7/1987 | Dahlem ................................. 51/429 |
| 4,800,063 | 1/1987 | Mierswa et al. ...................... 51/425 |

FOREIGN PATENT DOCUMENTS

| 0232770 | 12/1984 | Japan ................................... 51/429 |
| 2037149 | 7/1980 | United Kingdom ................. 51/410 |

*Primary Examiner*—Robert A. Rose
*Attorney, Agent, or Firm*—Beveridge, DeGrandi & Weilacher

[57] ABSTRACT

The invention provides a method of cutting and diassembling a cylindrical structure. According to the invention, the structure is cut into small blocks by using an abrasive jet operated by remote control and those small blocks are conveyed to the outside. To cut the structure into the small blocks, the structure is sequentially cut in the axial line direction and circumferential direction from the upper portion to the lower portion, or the structure is first cut into a ring-shaped primary block of a predetermined height and this primary block is conveyed to a predetermined location and is further cut into small secondary blocks, or the structure is first cut into a primary block having a predetermined arc length in the axial direction and this primary block is conveyed to a predetermined location and is further cut into small secondary blocks.

1 Claim, 3 Drawing Sheets

METHOD OF CUTTING AND DISASSEMBLING CYLINDRICAL STRUCTURE

CROSS REFERENCE TO RELATED APPLICATIONS

This application is a divisional of Ser. No. 250,953, filed Sept. 29, 1988.

FIELD OF THE INVENTION

The present invention relates to a method of cutting and disassembling a cylindrical structure which is a thermal or radiation shielding wall (hereinafter, referred to as an RSW) or the like in a nuclear power plant of, e.g. a boiling water (BWR) type.

DESCRIPTION OF RELATED BACKGROUND ART

The disassembly of such a concrete structure largely differs from that of an ordinary structure with respect to such points as, for example, that the concrete structure is made radioactive (in other words, it is changed to a new radioactive material), it is contaminated by the radioactive material, and there are many massive concrete structures each containing a large amount of reinforcing bars as a whole.

Therefore, since workers cannot approach the radioactive portions, it is necessary to perform the disassembling processes by the remote control and to prevent the scattering of radioactive disassembled pieces and particulates.

SUMMARY OF THE INVENTION

It is therefore, an object of the present invention to provide a method of cutting and disassembling a structure whereby a cylindrical structure made of reinforced concrete is cut into blocks and removed.

According to the invention, there is provided a method of cutting and disassembling a cylindrical structure from the side of the outer wall whereby the structure is sequentially cut from the upper portion to the lower portion in both the axial line direction and in the circumferential direction by using an abrasive jet operated by the remote control and then further cut into small blocks having predetermined dimensions, and subsequently the cut small blocks are carried to the outside.

According to the invention, there is provided a method of cutting and disassembling a cylindrical structure from the side of the inner wall whereby the structure is cut from the upper portion into ring-shaped primary blocks each having a predetermined height by using the abrasive jet by the remove control, the cut ring-shaped primary blocks are lifted up and carried out to a predetermined location, and each of the ring-shaped primary blocks carried to the predetermined location is then cut into small secondary blocks having predetermined dimensions in the circumferential direction.

Further, according to the invention, there is provided a method of cutting and disassembling a cylindrical structure from the side of the outer wall whereby the structure is cut into primary blocks each having a predetermined arc length in the axial direction by using the abrasive jet operated by the remote control, the cut primary blocks are lifted up and carried out to a predetermined location, and each of the primary block carried to the predetermined location is then cut into small secondary blocks having predetermined dimensions.

According to the invention, when disassembling a radiation shielding wall (RSW) in e.g., a BRW blocks having predetermined dimensions from the upper portion to the lower portion by remote control, the cut small blocks are carried to the outside and the RSW can be safely disassembled and removed without creating a danger for the workers.

According to the invention, when disassembling an RSW in, e.g., a BWR type nuclear power plant, the RSW is cut into ring-shaped primary blocks by remote control, the cut primary blocks are carried out to a predetermined location, each of the primary blocks carried to the predetermined location is further cut into small secondary blocks having predetermined dimensions, and the RSW can be safely disassembled and removed without risking a danger to humans.

Further, according to the invention, when disassembling an RSW in, e.g., a BWR type nuclear power plant, the RSW is cut into primary blocks each having a predetermined arc length in the axial direction by using remote control, the cut primary blocks are carried out to a predetermined location, each of the carried primary blocks is then cut into small secondary blocks having predetermined dimensions, and the RSW can be safely disassembled and removed without exerting a danger to the human workers.

When carrying out the method of the present invention, it is desirable to use apparatuses for processing the slurry and exhaust. With these apparatuses, for instance, the scattering of radioactive disassembled pieces and particulates can be prevented.

On the other hand, when carrying out the method of the invention, it is preferable to the primary block into the small secondary blocks by use of an abrasive jet or diamond wire.

BRIEF DESCRIPTION OF THE DRAWINGS

The above and other objects, features, and advantages of the present invention will become more apparent from the following detailed description and the appended claims with reference to the accompanying drawings, in which:

DETAILED DESCRIPTION OF PREFERRED EMBODIMENTS

An embodiment of the present invention will be described in detail hereinbelow with reference to the drawings.

Figure 1:
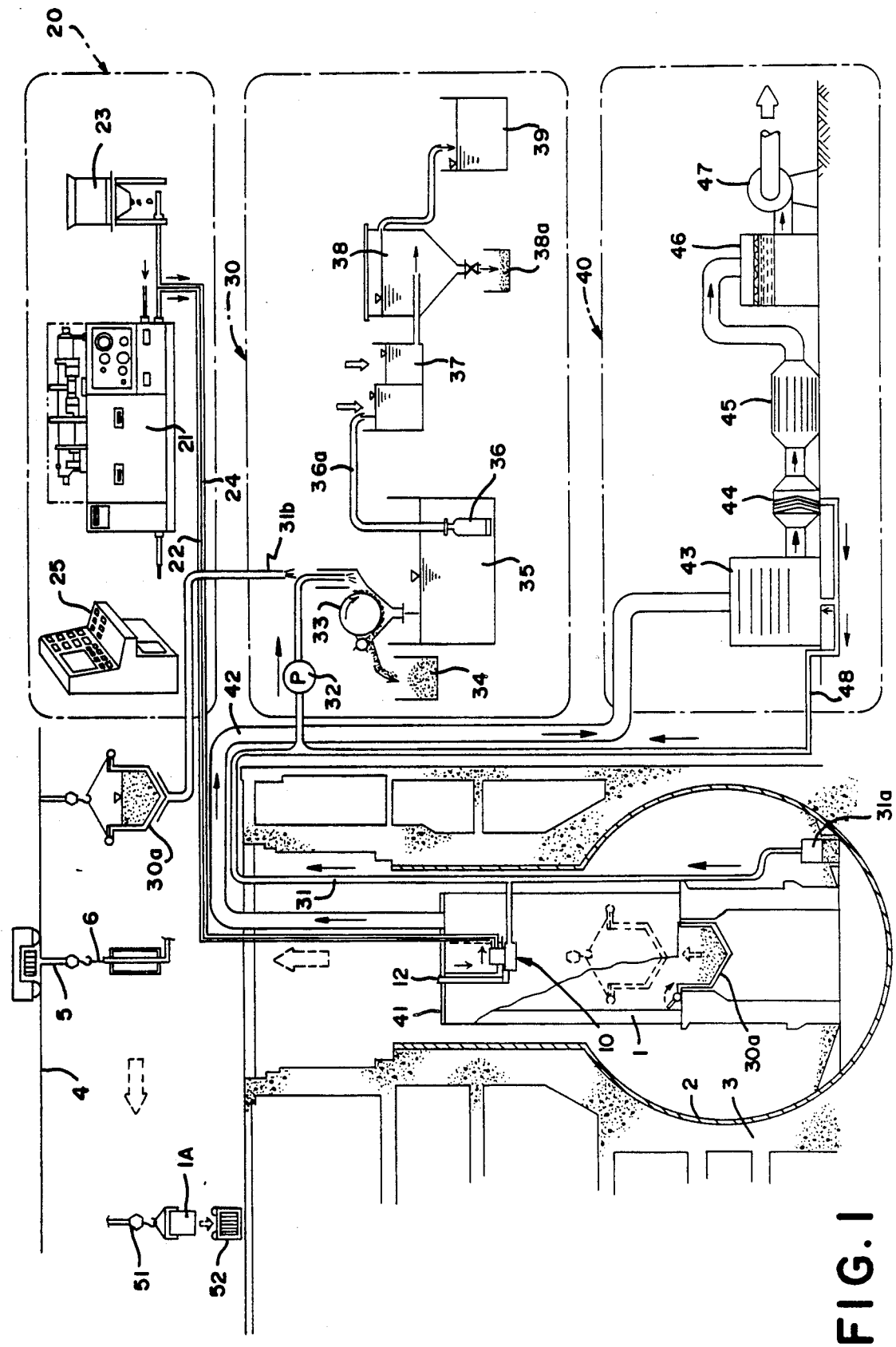
FIG. 1 is a flow diagram of an apparatus for carrying out the first embodiment of the present invention.

FIG. 1 shows the case where the first embodiment of a cutting and disassembling method of the invention is applied to a thermal or radiation shielding wall (hereinafter, referred to as an RSW) 1 in, e.g., a BWR type nuclear power plant.

In the diagram, the RSW 1 is cylindrical and, for example, has a diameter of about 10 m, a height of about 15 m, and a thickness of about 60 cm. The RSW 1 is constructed by filling concrete or mortar into a steel structure constructed by inner and outer surface shells consisting of thick steel plates each having a thickness in a range from about 30 to 45 cm. and partition plates between the shells. The RSW 1 is enclosed in a reactor container (hereinafter, referred to as a PCV) 3 covered by a biological shielding wall (hereinafter, referred to as BSW) 2.

A cutting and disassembling apparatus using an abrasive jet for carrying out the first embodiment of the invention comprises: a cutting apparatus 10 which is set to a cutting portion of the RSW 1; an abrasive jet apparatus 20; a slurry processing apparatus 30; and an exhaust processing apparatus 40. Existing cranes 5 and 51 in a building 4 are used as a lifting processing apparatus.

Figure 2:
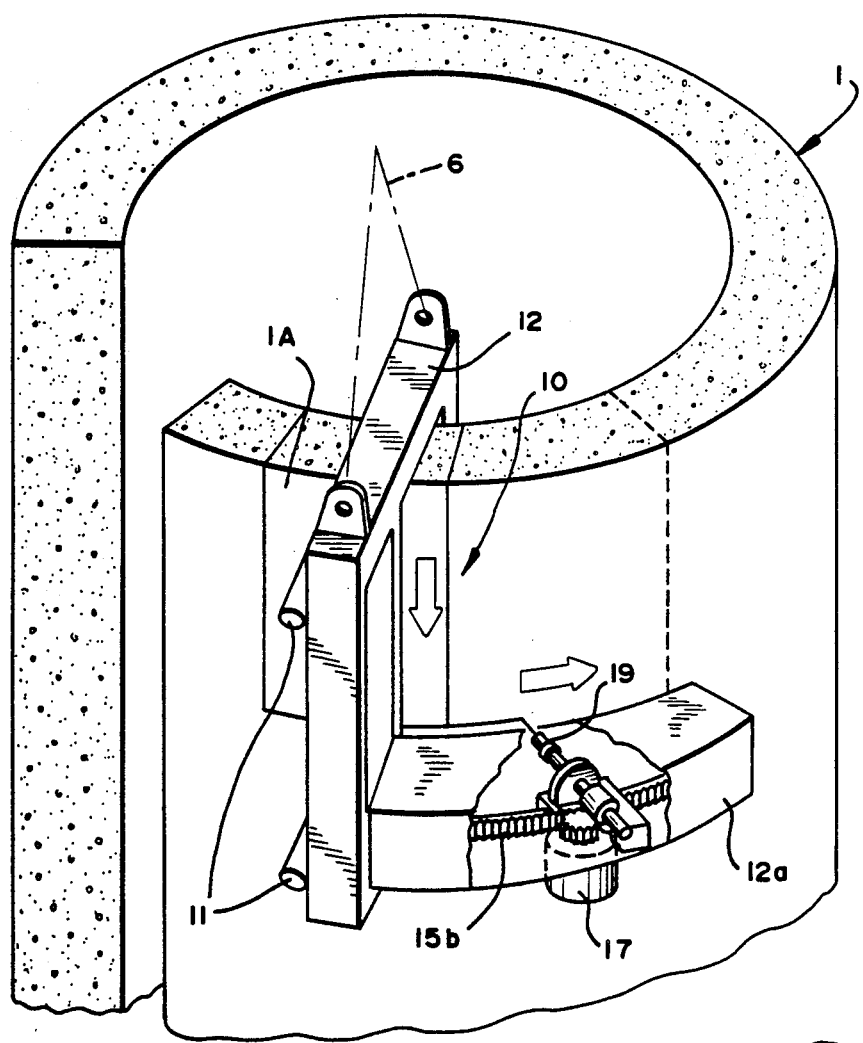
FIG. 2 is a perspective view showing a cutting apparatus.
Figure 3:
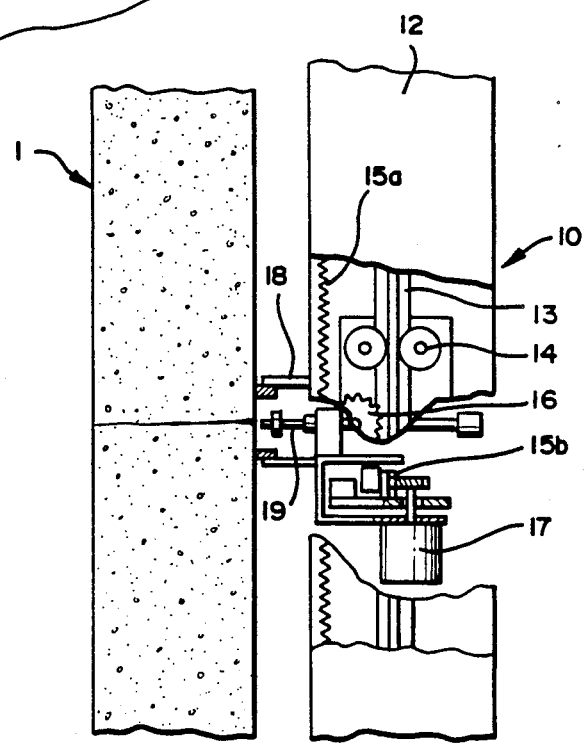
FIG. 3 is a cross sectional view taken along the line in a radial direction in FIG. 2.

In FIGS. 2 and 3, the cutting apparatus comprises: a guide frame 12; a soundproof slurry scattering preventing cover 18; and a jet nozzle 19. The guide frame 12 has a downward U-like shape which rides over the RSW 1 and is fixed by plunge jacks 11. An extending portion 12a is projected from the lower end of the guide frame 12 in the circumferential direction (to the right in the circumferential direction in the example shown in FIG. 2). In FIG. 3, the cover 18 is guided through an elevating roller 14 by an elevating guide rail 13 of the guide frame 12 and is elevated by a motor 16 of an elevating pinion gear adapted to be in engagement with an elevating rack 15a. The cover 18 is transversed by a motor 17 of a traverse pinion gear adapted to be in engagement with a traverse rack 15b formed in the extending portion 12a. On the other hand, a jet nozzle 19 is enclosed in a reactor container (hereinafter, referred to as a PCV) 3 covered by a biological shielding wall (hereinafter, referred to as BSW) 2.

A cutting and disassembling apparatus using an abrasive jet for carrying out the first embodiment of the invention comprises: a cutting apparatus 10 which is set to a cutting portion of the RSW 1; an abrasive jet apparatus 20; a slurry processing apparatus 30; and an exhaust processing apparatus 40. Existing cranes 5 and 51 in a building 4 are used as a lifting processing apparatus.

In FIGS. 2 and 3, the cutting apparatus comprises: a guide frame 12; a soundproof slurry scattering preventing cover 18; and a jet nozzle 19. The guide frame 12 has a downward U-like shape which rides over the RSW 1 and is fixed by plunge jacks 11. An extending portion 12a is projected from the lower end of the guide frame 12 in the circumferential direction (to the right in the circumferential direction in the example shown in FIG. 2). In FIG. 3, the cover 18 is guided through an elevating roller 14 by an elevating guide rail 13 of the guide frame 12 and is elevated by a motor 16 of an elevating pinion gear adapted to be in engagement with an elevating rack 15a. The cover 18 is traversed by a motor 17 of a traverse pinion gear adapted to be in engagement with a traverse rack 15b formed in the extending portion 12a. On the other hand, a jet nozzle 19 is attached in the cover 18 so as to be directed to the center of the RSW 1.

In FIG. 1, the abrasive jet apparatus 20 comprises: an extra high pressure pump 21; an abrasive material tank 23; and a monitor control panel 25. The pump 21 is connected to a water supply source (not shown) at one end and is also connected to the jet nozzle 19 through a high pressure water pipe 22 at the other end. The abrasive material tank 23 is connected to the jet nozzle 19 through a high pressure water pipe 22 at the other end. The abrasive material tank 23 is connected to the jet nozzle 19 through an abrasive material pipe 24. The monitor control panel 25 is used to control the entire cutting and disassembling apparatus including the abrasive jet apparatus 20 by the remote control.

The slurry processing apparatus 30 in FIG. 1 comprises: a slurry receiving tank 30a provided in the bottom portion of the RSW 1; a pump 32 connected through a slurry exhaust pipe to the tank 30a attached to the bottom portion of the PCV 3; a magnetic separator 33 provided on the downstream side of the pump 32; an abrasive material vessel 34 for receiving an abrasive material separated by the magnetic separator 33; a crude water tank 35 for receiving water from the magnetic separator 33; an agglutination reaction tank 37 connected to the crude water tank 35 through a crude water pump 36 and a crude water pipe 36a; a precipitation tank 38 provided on the downstream side of the agglutination reaction tank 37; a sludge vessel 38a for receiving a sludge separated in the precipitation tank 38; and a treated water tank 39 for receiving the water from the precipitation tank 38. In the diagram, reference numeral 31b denotes a slurry exhaust pipe for the slurry receiving tank 30a lifted.

The exhaust processing apparatus 40 in FIG. 1 comprises: a heat exchanger 43 for cooling which is connected through an exhaust pipe 42 to a steel cover 41 for covering the upper end opening portion of the RSW 1; and a mist eliminator 44, an electric heater 45, a filter 46, and a turbo blower 47 which are sequentially provided on the downstream side of the heat exchanger 43. The heat exchanger 43 and mist eliminator 44 are connected to the slurry exhaust pipe 43 of the slurry processing apparatus 30 through a pipe 48. The turbo blower 47 is connected to an existing exhaust processing equipment (not shown).

The operation in the first embodiment of the invention will now be described.

First, the cutting apparatus 10 is suspended by the crane 5 by using a wire 6 and put down such that the guide frame 12 rides over the RSW 1. The plunge jacks 11 are extended to thereby fix the guide frame 12 to the RSW 1. Then, the wire 6 is removed and the steel cover 41 is set.

Next, the abrasive jet apparatus 20, slurry processing apparatus 30, and exhaust processing apparatus 40 are placed in operation. The motor 16 of the elevating pinion gear is driven to lower the nozzle 19 by a distance of, e.g., 2.98 m. The motor 17 of the traverse pinion gear is driven to traverse the nozzle 19 by a distance of, e.g., 1.48 m. The RSW 1 is cut into an L-shape by the abrasive jet. At this time, the slurry is collected to the slurry receiving tank 30a in the inner bottom portion of the RSW 1. The slurry which leaks to the outside of the RSW 1 is processed by the slurry processing apparatus 30 through the underwater pump 31a attached to the bottom portion of the PCV 3. The particulates and gases are processed by the exhaust processing apparatus 40. The receiving tank 30a is lifted up by the crane 5 at a proper timing and the slurry is exhausted by the slurry exhaust pipe 31b.

Next, in a manner similar to the above, the guide frame 12 is moved to the right in the circumferential direction by a distance of, for instance, 1.48 m and fixed to the right-handed portion of the L-shaped portion which has already been cut. The RSW 1 is cut into an L-character shape and a small rectangular block 1A having, for instance, a length of 2.9 m and a square cross section in which a length of each side is about 1.48 m is obtained.

Figure 5:
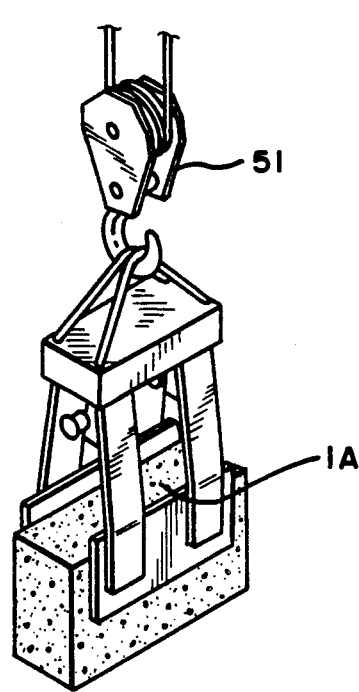
FIGS. 4 to 6 are perspective views showing steps of carrying out a small block, respectively.
Figure 6:
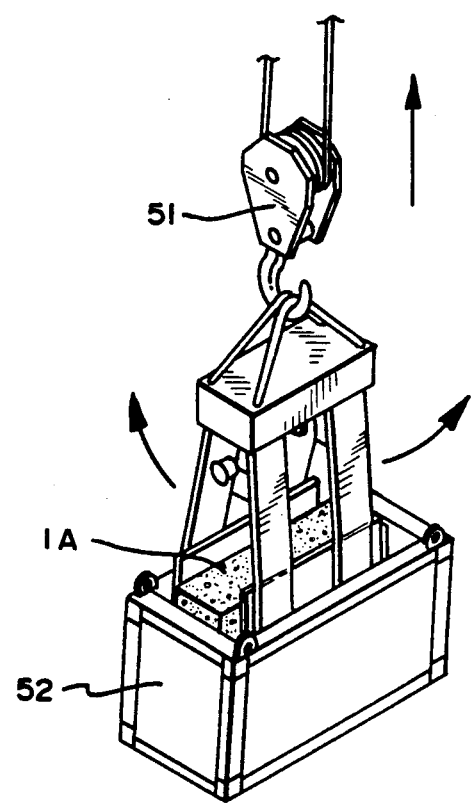
Figure 4:
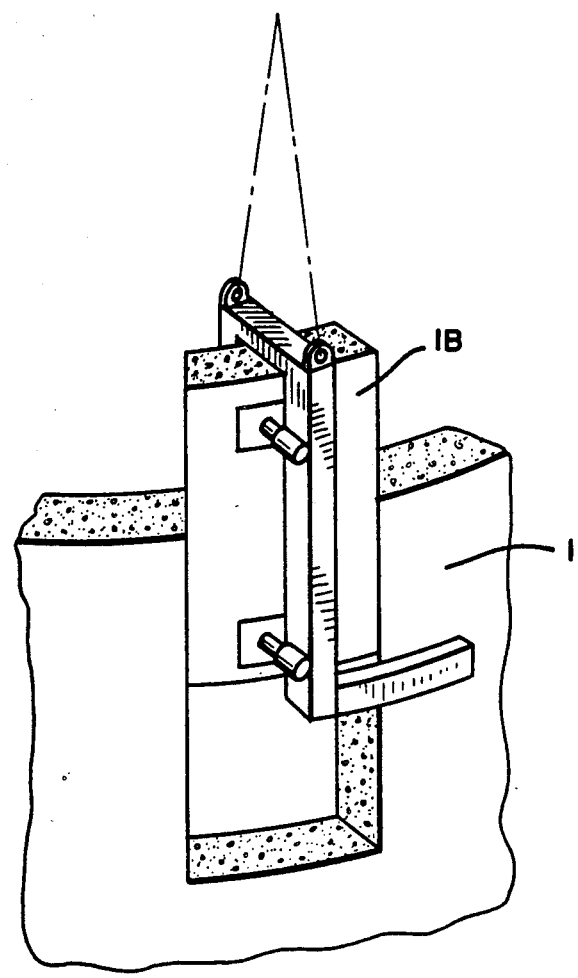

Next, the small block 1A is lifted up by the crane 5 (FIG. 4), carried out to the building 4, lifted again by the crane 51 (FIG. 5), and enclosed in a container 52 (FIG. 6).

As described above, according to the present invention, a structure such as an RSW or the like is cut into small blocks each having predetermined dimensions in the direction from the upper portion of the lower portion by the remote control, or it is cut into a ring-shaped primary block or a primary block of a predetermined arc length in the axial direction. Thereafter, the primary block is conveyed out to a predetermined location and is further cut into small secondary blocks of predetermined dimensions. The resultant small secondary block is enclosed into the container. Therefore, the structure can be safely disassembled without the risk of danger or hazard to humans.

Further variations and modifications of the foregoing will be apparent to those skilled in the art and are intended to be encompassed by the claims appended hereto.

What is claimed is:

1. An apparatus for cutting and disassembling an object having a circumference including:
   a cutting apparatus 10 comprising a guide frame 12, a soundproof slurry scattering preventing cover 18, a jet nozzle 19, said guide frame 12 having a downward U-like shape which rides over on object to be cut and is fixed in place by plunge jacks 11, and extending portion 12a projecting from the lower end of the guide frame 12 in the circumferential direction, said cover 18 being guided through an elevating roller 14 by an elevating guide rail 13 of the guide frame 12 and being adapted to be elevated by a motor 16 and an elevating pinion gear adapted to be in engagement with an elevating rack 15a, said cover 18 being traversed by a motor 17 of a traverse pinion gear adapted to be in engagement with a traverse rack 15b formed in the extending portion 12a,
   an abrasive jet apparatus 20 comprising an extra high pressure pump 21, an abrasive tank 23, and a monitor control panel 25, said pump 21 being connected to the jet nozzle 19 through a high pressure water pipe 22, said abrasive material tank 23 being connected to the jet nozzle 19 through an abrasive material pipe 24,
   and a slurry processing apparatus 30 comprising a slurry receiving tank 30a, a pump 32 connected through a slurry exhaust pipe 31 to the tank 30a and an underwater pump 31a, a magnetic separator 33 provided on the downstream side of the pump 32, an abrasive material vessel 34 for receiving an abrasive material separated by the magnetic separator 33, a crude water tank 35 for receiving water from the magnetic separator 33, an agglutination reaction tank 37 connected to the crude water tank 35 through a crude water pump 36 and a crude water pipe 36a, a precipitation tank 38 provided on the downstream side of the agglutination reaction tank 37, a sludge vessel 38a for receiving a sludge separated in the precipitation tank 38, and a treated water tank 39 receiving the water from the precipitation tank 38.

* * * * *

UNITED STATES PATENT AND TRADEMARK OFFICE
CERTIFICATE OF CORRECTION

PATENT NO. : 5,001,870

DATED : March 26, 1991

INVENTOR(S) : Minoru Harada, Kohei Mio, Isaya Yokota, Kenjiro Nakamura and Kenji Nishi It is certified that error appears in the above-identified patent and that said Letters Patent is hereby corrected as shown below:

Title page:

Item [75] Inventors: Minoru Harada, Tokyo;
Kohei Mio, Kanagawa;
Isaya Yokota, Tokyo;
Kenjiro Nakamura, Chiba;
Kenji Nishi, Tokyo, all of Japan Signed and Sealed this Twenty-first Day of July, 1992

Attest:

DOUGLAS B. COMER

*Attesting Officer*     Acting Commissioner of Patents and Trademarks